(12) United States Patent
Marappan et al.

(10) Patent No.: US 10,949,104 B2
(45) Date of Patent: Mar. 16, 2021

(54) HOST DEVICE CONFIGURED FOR AUTOMATIC CREATION OF MULTI-PATH LOGICAL DEVICES WITH USER-DEFINED NAMES

(71) Applicant: EMC IP Holding Company LLC, Hopkinton, MA (US)

(72) Inventors: Gopinath Marappan, Coimbatore (IN); Vinay G. Rao, Bangalore (IN); Madhu Tarikere, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 96 days.

(21) Appl. No.: 16/402,673

(22) Filed: May 3, 2019

(65) Prior Publication Data
US 2020/0348861 A1 Nov. 5, 2020

(51) Int. Cl.
*G06F 3/06* (2006.01)

(52) U.S. Cl.
CPC .......... *G06F 3/0631* (2013.01); *G06F 3/0604* (2013.01); *G06F 3/067* (2013.01); *G06F 3/0644* (2013.01); *G06F 3/0659* (2013.01); *G06F 3/0665* (2013.01)

(58) Field of Classification Search
CPC .... G06F 3/0604; G06F 3/0631; G06F 3/0644; G06F 3/0659; G06F 3/0665; G06F 3/067; G06F 3/0605
See application file for complete search history.

(56) References Cited

U.S. PATENT DOCUMENTS

| | | | |
|---|---|---|---|
| 6,629,189 B1 * | 9/2003 | Sandstrom | G06F 3/0601 711/4 |
| 6,687,746 B1 | 2/2004 | Shuster et al. | |
| 6,697,875 B1 | 2/2004 | Wilson | |
| 7,454,437 B1 | 11/2008 | Lavallee et al. | |
| 7,770,053 B1 | 8/2010 | Bappe et al. | |
| 7,809,912 B1 | 10/2010 | Raizen et al. | |
| 7,818,428 B1 | 10/2010 | Lavallee et al. | |
| 7,904,681 B1 | 3/2011 | Bappe et al. | |
| 7,925,872 B2 | 4/2011 | Lai et al. | |

(Continued)

OTHER PUBLICATIONS

Kris Piepho, "Dell EMC SC Series Storage: Microsoft Multipath I/O," Dell EMC Best Practices, Jan. 2017, 57 pages.

(Continued)

*Primary Examiner* — Larry T Mackall
(74) *Attorney, Agent, or Firm* — Ryan, Mason & Lewis, LLP

(57) ABSTRACT

An apparatus comprises a host device configured to communicate over a network with a storage system. The host device comprises a multi-path input-output (MPIO) driver configured to control delivery of input-output (IO) operations from the host device to the storage system over the network. The MPIO driver is further configured, responsive to creation of a first multi-path logical device for a logical volume of the storage system, to query the storage system to determine a user-defined name for the logical volume, and responsive to receipt of the user-defined name for the logical volume from the storage system, to create a second multi-path logical device having the user-defined name. The MPIO driver processes IO operations directed to the second multi-path logical device having the user-defined name as if those IO operations were actually directed to the first multi-path logical device.

20 Claims, 3 Drawing Sheets

(56) References Cited

U.S. PATENT DOCUMENTS

| | | |
|---|---|---|
| 9,400,611 B1 | 7/2016 | Raizen |
| 9,594,780 B1 | 3/2017 | Esposito et al. |
| 9,778,852 B1 | 10/2017 | Marshak et al. |
| 10,652,206 B1 * | 5/2020 | Pusalkar ............... G06F 3/0659 |
| 2004/0010563 A1 | 1/2004 | Forte et al. |
| 2008/0043973 A1 | 2/2008 | Lai et al. |
| 2008/0086618 A1 * | 4/2008 | Qi ........................ G06F 3/0635 711/170 |
| 2008/0126857 A1 * | 5/2008 | Basham ............. G06F 11/3466 714/25 |
| 2011/0197027 A1 | 8/2011 | Balasubramanian et al. |
| 2016/0117113 A1 | 4/2016 | Li et al. |

OTHER PUBLICATIONS

NVM Express, "NVM Express, Revision 1.3," NVM Express, May 1, 2017, 282 pages.
VMWARE, "Multipathing Configuration for Software iSCSI Using Port Binding," Technical White Paper, Apr. 25, 2012, 15 pages.
Dell EMC, "Dell EMC SC Series Storage: Microsoft Multipath I/O," Dell EMC Engineering, Jun. 2017, 56 pages.
Dell EMC, "Dell EMC PowerPath Family: PowerPath and PowerPath/VE Multipathing," Data Sheet, 2017, 3 pages.
EMC, "EMC PowerPath and PowerPath/VE Family for Windows," Installation and Administration Guide, Oct. 2018, 102 pages.
EMC, "EMC Powerpath Load Balancing and Failover", Comparison with native MPIO operating system solutions, Feb. 2011, 28 pages.
U.S. Appl. No. 15/849,828 filed in the name of Sanjib Mallick et al. filed Dec. 21, 2017 and entitled "Storage System with Input-Output Performance Control Utilizing Application Process Detection."
U.S. Appl. No. 15/795,653 filed in the name of Maneesh Pusalkar et al. filed Oct. 27, 2017 and entitled "Storage System with Network-Wide Configurable Device Names."

* cited by examiner

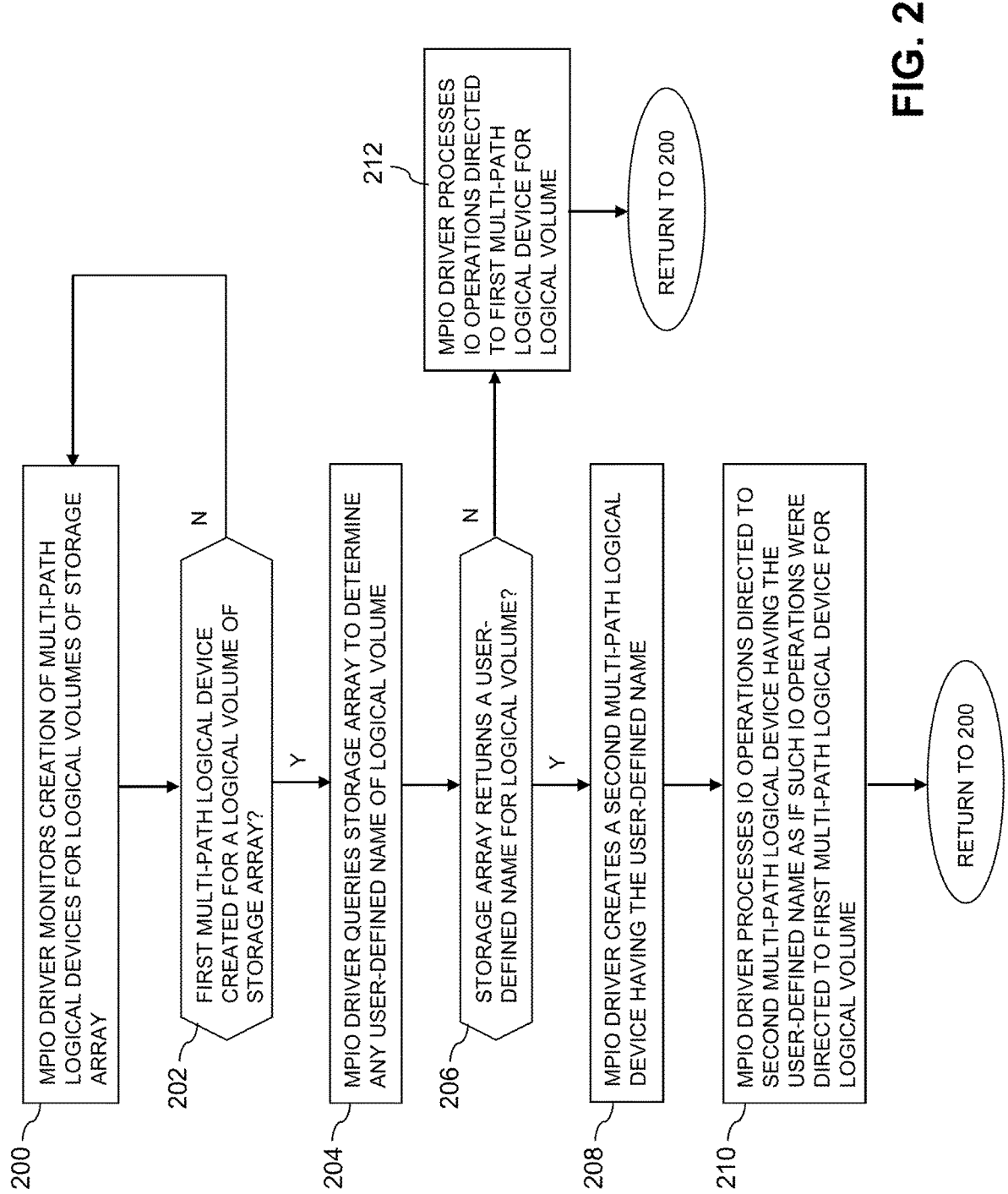

User-space /dev ("udev") rule:
```
[root@lnd198032 ~]# cat 81-pp-nice-name.rules
ACTION=="add", KERNEL=="emcpower*[!0-9]",
PROGRAM="/root/pp_mkdevnode.sh %k"
```

Script:
```
[root@lnd198032 ~]# cat pp_mkdevnode.sh
!/bin/sh nice_name=`/sbin/powermt display dev=$1 | grep "Logical
device ID=" | sed -e 's/.*\[\(.*\)\].*/\1/' | sed -e
's/\s/-/'` major=`cat /proc/partitions | grep -w $1 | awk '{print $1}'`
minor=`cat /proc/partitions | grep -w $1 | awk '{print $2}'`
echo $nice_name
echo $major
echo $minor mknod /dev/$nice_name b $major $minor
```

FIG. 3

HOST DEVICE CONFIGURED FOR AUTOMATIC CREATION OF MULTI-PATH LOGICAL DEVICES WITH USER-DEFINED NAMES

FIELD

The field relates generally to information processing systems, and more particularly to storage in information processing systems.

BACKGROUND

Storage arrays and other types of storage systems are often shared by multiple host devices over a network. In some arrangements of this type, a given storage system allows user-defined names to be assigned to particular logical volumes of the storage system. Such user-defined names are sometimes referred to as "nice names" of the logical volumes. However, in host devices that incorporate multi-pathing software for communicating with the storage system, tedious and time-consuming manual options are often required in order to allow user applications to determine and utilize the appropriate user-defined names for respective logical volumes. This can be particularly problematic in storage systems comprising large numbers of logical volumes, such as hundreds or thousands of logical volumes.

SUMMARY

Illustrative embodiments configure a multi-path layer of one or more host devices to include functionality for automatic creation of multi-path logical devices with user-defined names in conjunction with communication with a storage array or other type of storage system via a storage area network (SAN) or other type of network. The multi-path layer illustratively comprises at least one multi-path input-output (MPIO) driver configured to process input-output (10) operations of at least one host device.

The multi-path layer in such arrangements can be configured to detect creation of a multi-path logical device for a logical volume, to determine if there is a user-defined name for that logical volume, and to automatically create an additional multi-path logical device having the user-defined name, so as to thereby facilitate user application utilization of the user-defined name for the logical volume.

In one embodiment, an apparatus comprises a host device configured to communicate over a network with a storage system. The host device comprises an MPIO driver configured to control delivery of IO operations from the host device to the storage system over the network. The MPIO driver is further configured, responsive to creation of a first multi-path logical device for a logical volume of the storage system, to query the storage system to determine a user-defined name for the logical volume, and responsive to receipt of the user-defined name for the logical volume from the storage system, to create a second multi-path logical device having the user-defined name. The MPIO driver processes IO operations directed to the second multi-path logical device having the user-defined name as if those IO operations were actually directed to the first multi-path logical device.

The MPIO driver in some embodiments is further configured to interact with a device manager that operates in accordance with a plurality of specified rules. For example, a given one of the rules illustratively comprises a rule that triggers execution of a script responsive to creation of the first multi-path logical device for the logical volume of the storage system. The script triggered by the given rule is illustratively configured to query the storage system to determine the user-defined name for the logical volume, and responsive to receipt of the user-defined name for the logical volume from the storage system, to create the second multi-path logical device having the user-defined name.

In some embodiments, querying the storage system to determine a user-defined name for the logical volume comprises executing a display utility command that obtains the user-defined name from the storage system.

Additionally or alternatively, creating the second multi-path logical device having the user-defined name in some embodiments further comprises determining a major number and a minor number for the first multi-path logical device, and configuring the second multi-path logical device to have the same major number and the same minor number as the first multi-path logical device.

Illustrative embodiments disclosed herein advantageously allow one or more user applications running on a given host device to automatically obtain the benefit of the user-defined name of a particular logical volume, while completely avoiding the need for any manual operations for discovery and mapping of the user-defined name.

These and other illustrative embodiments include, without limitation, apparatus, systems, methods and computer program products comprising processor-readable storage media.

BRIEF DESCRIPTION OF THE DRAWINGS

FIG. 2 is a flow diagram of a process for automatic creation of multi-path logical devices with user-defined names in a multi-path layer of a host device in an illustrative embodiment.

FIG. 3 shows examples of software code for a rule and a corresponding script utilized in one possible implementation of the FIG. 2 process for automatic creation of multi-path logical devices with user-defined names.

DETAILED DESCRIPTION

Figure 1:
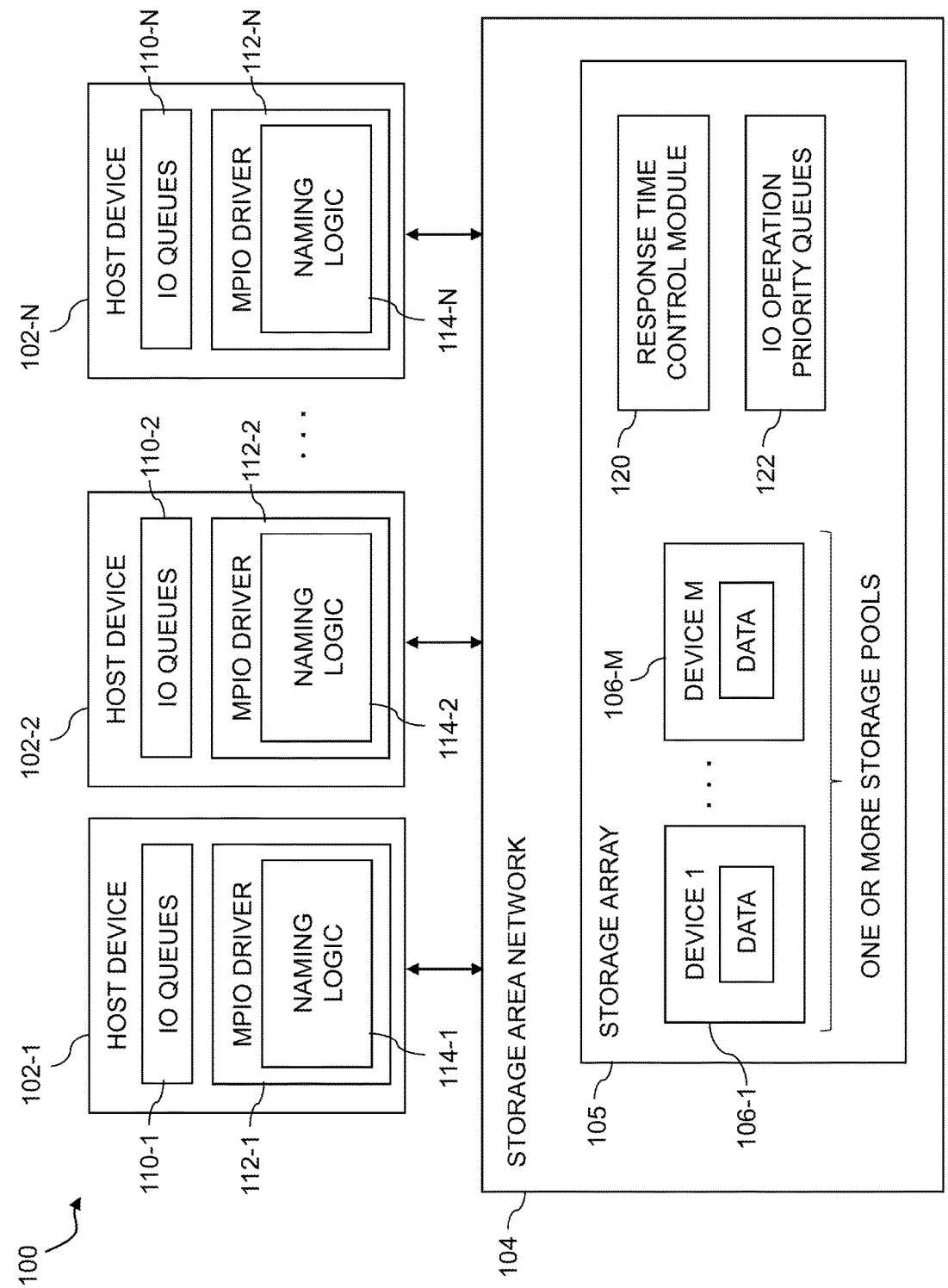
FIG. 1 is a block diagram of an information processing system configured with functionality for automatic creation of multi-path logical devices with user-defined names in a multi-path layer of a host device in an illustrative embodiment.

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

FIG. 1 shows an information processing system 100 configured in accordance with an illustrative embodiment. The information processing system 100 comprises a plurality of host devices 102-1, 102-2, . . . 102-N. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools. The storage array 105 and its associated storage devices 106 are an example of what is more generally referred to herein as a "storage system." This storage system in the present embodiment is shared by the host devices 102, and is therefore also referred to herein as a "shared storage system." Other embodiments can include only a single host device, possibly configured to have exclusive use of the storage system.

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes, also referred to herein as simply "logical volumes."

Each of the host devices 102 illustratively has multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The host devices 102 comprise respective sets of IO queues 110-1, 110-2, . . . 110-N and respective MPIO drivers 112-1, 112-2, . . . 112-N. The MPIO drivers 112 collectively comprise a multi-path layer of the host devices 102. The multi-path layer provides functionality for automatic creation of multi-path logical devices with user-defined names using respective instances of naming logic 114-1, 114-2, . . . 114-N implemented within the MPIO drivers 112. At least a subset of the user-defined names in some embodiments more particularly comprise so-called "nice names" that are assigned by users to respective logical volumes of the storage array 105. Other types of user-defined names can be used in other embodiments, and the term "user-defined name" is therefore intended to be broadly construed so as to encompass various types of user-friendly names or other types of names that may be assigned to respective logical volumes in order to facilitate utilization of those logical volumes by users. Utilization of functionality associated with user-defined names in illustrative embodiments should not be viewed as requiring any particular configuration of storage array 105, but is more generally applicable to wide variety of different types of storage systems.

The MPIO drivers 112 may comprise, for example, otherwise conventional MPIO drivers, such as PowerPath® drivers from Dell EMC, suitably modified in the manner disclosed herein to include functionality for automatic creation of multi-path logical devices with user-defined names. Other types of MPIO drivers from other driver vendors may be suitably modified to incorporate functionality for automatic creation of multi-path logical devices with user-defined names as disclosed herein.

The MPIO driver 112-1 is configured to deliver IO operations selected from its corresponding set of IO queues 110-1 to the storage array 105 via selected ones of multiple paths over the SAN 104. The sources of the IO operations stored in the set of IO queues 110-1 illustratively include respective processes of one or more applications executing on the host device 102-1. Other types of sources of IO operations may be present in a given implementation of system 100.

The paths from the host device 102-1 to the storage array 105 illustratively comprise paths associated with respective initiator-target pairs, with each initiator comprising a host bus adaptor (HBA) or other initiating entity of the host device 102-1 and each target comprising a port or other targeted entity corresponding to one or more of the storage devices 106 of the storage array 105. As noted above, the storage devices 106 illustratively comprise LUNs or other types of logical storage devices.

In some embodiments, the paths are associated with respective communication links between the host device 102-1 and the storage array 105 with each such communication link having a negotiated link speed. For example, in conjunction with registration of a given HBA to a switch of the SAN 104, the HBA and the switch may negotiate a link speed. The actual link speed that can be achieved in practice in some cases is less than the negotiated link speed, which is a theoretical maximum value.

Various scheduling algorithms, load balancing algorithms and/or other types of algorithms can be utilized by the MPIO driver 112-1 in delivering IO operations from the IO queues 110-1 to the storage array 105 over particular paths via the SAN 104. Each such IO operation is assumed to comprise one or more commands for instructing the storage array 105 to perform particular types of storage-related functions such as reading data from or writing data to particular logical volumes of the storage array 105. Such commands are assumed to have various payload sizes associated therewith, and the payload associated with a given command is referred to herein as its "command payload."

A command directed by the host device 102-1 to the storage array 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective HBAs of the host device 102-1 and that the targets of the plurality of initiator-target pairs comprise respective ports of the storage array 105.

A mapping of initiators, targets and logical devices is illustratively used reflect an assignment of one or more of the initiators to one or more of the targets for accessing one or more of the logical devices. The mapping in some embodiments indicates the particular storage array port which each HBA should utilize in accessing certain ones of the logical devices. Such a mapping of initiators, targets and logical devices is illustratively maintained by the host device 102-1, generally with the involvement of or otherwise under the control of its corresponding MPIO driver 112-1 and its naming logic 114-1.

As indicated above, the MPIO driver 112-1 is configured to control delivery of IO operations from the host device 102-1 to the storage array 105 over the SAN 104. The MPIO driver 112-1 in controlling delivery of IO operations from the host device 102-1 to the storage array 105 over the SAN 104 is further configured to select particular ones of the IO operations for delivery over particular ones of a plurality of paths from the host device 102-1 to the storage array 105.

At least some of the paths from the host device 102-1 to the storage array 105 may be determined using an initial path discovery scan performed in conjunction with booting of the host device 102-1. It is assumed for the description of this embodiment that the host device 102-1 has discovered a plurality of paths to the storage array 105, and further that at least one logical storage device of the storage array 105 is visible to the host device 102-1 on each of the paths.

The path discovery scan can be repeated responsive to one or more detected path changes or under other specified conditions. For example, a storage administrator or other user may perform zoning and/or masking changes to the storage array 105 that result in at least one new path becoming available to the host device 102-1. Accordingly, the set of multiple paths over which IO operations are delivered from the host device 102-1 to particular logical devices of the storage array 105 can change over time.

The MPIO driver 112-1 is further configured, responsive to creation of a first multi-path logical device for a logical volume of the storage array 105, to query the storage array 105 to determine a user-defined name for the logical volume, and responsive to receipt of the user-defined name for the logical volume from the storage array 105, to create a second multi-path logical device having the user-defined name.

The MPIO driver 112-1 then processes IO operations directed to the second multi-path logical device having the user-defined name as if those IO operations were actually directed to the first multi-path logical device. Accordingly, one or more applications running on the host device 102-1 may be configured to direct the IO operations to the second multi-path logical device having the user-defined name. References herein to processing IO operations directed to the second multi-path logical device having the user-defined name as if those IO operations were actually directed to the first multi-path logical device are intended to be broadly construed, so as to encompass various arrangements in which application users are permitted to directly utilize logical devices having respective user-defined names without the need for any manual intervention to determine the user-defined name.

A more detailed example of an arrangement of this type is described below in conjunction with the embodiment of FIG. 2. Software code for a rule and a corresponding script utilized in one possible implementation of the FIG. 2 process for automatic creation of multi-path logical devices with user-defined names is shown in FIG. 3.

The multi-path logical devices are utilized to access LUNs or other logical volumes of the storage array 105. The logical volumes of the storage array 105 are also referred to herein as logical storage volumes or logical storage devices.

In some embodiments, the MPIO driver 112-1 is further configured to interact with a device manager that operates in accordance with a plurality of specified rules. A given one of the rules comprises a rule that triggers execution of a script responsive to creation of the first multi-path logical device for the logical volume of the storage array 105. The script is configured to query the storage array 105 to determine the user-defined name for the logical volume, and responsive to receipt of the user-defined name for the logical volume from the storage array 105, to create the second multi-path logical device having the user-defined name. As mentioned previously, examples of a rule and a script of this type are shown in FIG. 3.

In some embodiments, the device manager is implemented at least in part within the MPIO driver 112-1, although numerous other device manager implementations are possible. For example, the device manager in some embodiments comprises a user-space/dev ("udev") component of the host device 102.

Querying the storage array 105 to determine a user-defined name for the logical volume illustratively comprises sending a predetermined command to the storage array 105. For example, the predetermined command can comprise a "vendor unique" or VU command in an otherwise standardized command format, such as a SCSI command format, although other types of commands and command formats can be used.

In some embodiments, querying the storage array 105 to determine a user-defined name for the logical volume comprises executing a display utility command that obtains the user-defined name from the storage array 105. For example, execution of the display utility command illustratively returns an identifier of the first multi-path logical device, an identifier of the logical volume, and the user-defined name for the logical volume. The display utility command in such an embodiment is illustratively triggered by a rule configured to detect a specified naming pattern for multi-path logical device names that encompasses an automatically-assigned name of the first multi-path logical device.

Creating a second multi-path logical device having the user-defined name illustratively comprises determining a major number and a minor number for the first multi-path logical device, and configuring the second multi-path logical device to have the same major number and the same minor number as the first multi-path logical device. The major and minor numbers of a given block device or other type of logical device are illustratively in the format "major:minor" although other formats could be used.

The MPIO driver 112-1 in some embodiments is further configured, responsive to removal of the first multi-path logical device, to remove the second multi-path logical device having the user-defined name.

An example process for automatic creation of multi-path logical devices with user-defined names illustratively includes the following steps:

1. Identify addition of a new logical device. For example, in the case of a host device with a Linux operating system, this may be achieved using a user-space/dev ("udev") rule to obtain a new logical device add notification. The udev is an example of what is more generally referred to herein as a "device manager."

2. Get the major/minor number of the logical device.

3. Query array for user-defined name.

4. If user-defined name is available, then create a new logical device with the user-defined name.

This process is only an example, and numerous other sets of processing operations can be used in other embodiments.

Although these and other operations associated with automatic creation of multi-path logical devices with user-defined names are controlled by or otherwise implemented at least in part by the MPIO driver 112-1 in the present embodiment, this is by way of example rather than limitation. In other embodiments, at least portions of these operations can be carried out elsewhere in the host device 102-1.

Accordingly, at least a portion of the automatic creation operations and other operations referred to herein as being performed by or under the control of the MPIO driver 112-1 can in some embodiments be performed at least in part outside of the MPIO driver 112-1, such as in the host device 102-1 generally.

A wide variety of other types of embodiments can be configured. For example, in some embodiments, possibly implemented using certain types of host device operating systems, such as non-Linux operating systems, the querying of the storage array 105 need not be responsive to a determination that a first logical device has been created for a logical volume of the storage array 105, and can instead be initiated responsive to one or more other specified conditions. In arrangements of this type, the second multi-path logical device referred to above may instead comprise a first multi-path logical device created for the logical volume. Numerous other alternative embodiments are possible.

In some embodiments, the MPIO driver 112-1 implements path selection functionality for delivery of IO operations from the set of IO queues 110-1 to the storage array 105. Such an algorithm illustratively comprises a scheduling algorithm, load balancing algorithm or other type of algorithm utilized in selecting IO operations for delivery over particular selected ones of multiple available paths. A given such algorithm can incorporate both scheduling and load balancing functionality.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of the storage array 105. The corresponding logical device illustratively comprises a LUN or other logical storage volume to which the particular IO operation is directed.

As indicated previously, absent use of the techniques disclosed herein for automatic creation of multi-path logical devices with user-defined names, tedious and time-consuming manual options are often required in order to allow user applications to determine and utilize the appropriate user-defined names for respective logical volumes. This can be particularly problematic in storage systems comprising large numbers of logical volumes, such as hundreds or thousands of logical volumes.

Such drawbacks are advantageously overcome in illustrative embodiments herein by utilization of a multi-path layer comprising one or more of the MPIO drivers 112 of one or more host devices to automatically create multi-path logical devices with user-defined names in the manner described above.

It should be noted that paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105.

Addition or deletion of paths can also occur as a result of zoning and masking changes or other types of storage system reconfigurations performed by a storage administrator or other user.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible.

For each of one or more new paths identified in the path discovery scan, the host device 102-1 may be configured to execute a host registration operation for that path. The host registration operation for a given new path illustratively provides notification to the storage array 105 that the host device 102-1 has discovered the new path.

The above-described functions of the MPIO driver 112-1 associated with automatic creation of multi-path logical devices with user-defined names are carried out at least in part under the control of its naming logic 114-1. For example, the naming logic 114-1 is illustratively configured to control performance of the steps of the flow diagram to be described below in conjunction with FIG. 2. In other embodiments, one or more such steps can be more generally performed by the host device 102-1.

It is assumed that each of the other MPIO drivers 112 is configured in a manner similar to that described above and elsewhere herein for the first MPIO driver 112-1. The other host devices 102 of the system 100 are therefore also configured to communicate over the SAN 104 with the storage array 105 and the MPIO drivers 112 of such other host devices are each similarly configured to deliver IO operations from its corresponding one of the sets of IO queues 110 to the storage array 105 over selected paths through the SAN 104, and to perform the disclosed functionality for automatic creation of multi-path logical devices with user-defined names.

Accordingly, functionality described above in the context of the first MPIO driver 112-1 and the first host device 102-1 is assumed to be similarly performed by each of the other MPIO drivers 112-2 through 112-N and/or more generally by their respective host devices 102-2 through 102-N.

The MPIO drivers 112 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support automatic creation of multi-path logical devices with user-defined names.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays.

The storage array 105 in the present embodiment further comprises additional components such as response time control module 120 and IO operation priority queues 122, illustratively configured to make use of the above-described persistent memory. For example, the response time control module 120 may be used to implement storage array based adjustments in response time for particular IO operations based at least in part on service level objective (SLO) information stored by the storage array 105 in its persistent memory. The response time control module 120 operates in conjunction with the IO operation priority queues 122.

The storage array 105 utilizes its IO operation priority queues 122 to provide different levels of performance for IO operations. For example, the IO operation priority queues 122 may have respective different priority levels. The storage array 105 may be configured to provide different priority levels for different ones of the IO operations by assigning different ones of the IO operations to different ones of the IO operation priority queues 122. The IO operation priority queues 122 are illustratively associated with respective SLOs for processing of IO operations in the storage array 105.

Process tags may be used in assigning different ones of the IO operations to different ones of the IO operation priority queues 122, as disclosed in U.S. patent application Ser. No. 15/849,828, now U.S. Pat. No. 10,474,367, filed Dec. 21, 2017 and entitled "Storage System with Input-Output Performance Control Utilizing Application Process Detection," which is incorporated by reference herein.

As mentioned above, communications between the host devices 102 and the storage array 105 may utilize PCIe connections or other types of connections implemented over one or more networks. For example, illustrative embodiments can use interfaces such as Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage array 105 may additionally or alternatively be configured to implement multiple distinct storage tiers of a multi-tier storage system. By way of example, a given multi-tier storage system may comprise a fast tier or performance tier implemented using flash storage devices, and a capacity tier implemented using hard disk drive devices. A wide variety of other types of server-based flash storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, disk drives, flash drives, solid-state drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array.

For example, the storage array 105 may comprise one or more storage arrays such as VNX®, Symmetrix VMAX® and Unity™ storage arrays, commercially available from Dell EMC. Other types of storage products that can be used in implementing a given storage system in illustrative embodiments include software-defined storage products such as ScaleIO™, cloud storage products such as Elastic Cloud Storage (ECS), object-based storage products such as Atmos, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, MPIO drivers 112 and instances of naming logic 114 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 212, and is suitable for use in the system 100 but is more generally applicable to other types of systems comprising at least one host device and a storage system. The storage system in this embodiment is assumed to comprise at least one storage array having a plurality of storage devices. The storage devices can include logical storage devices such as LUNs or other logical storage volumes, also referred to as logical volumes in the following description.

The steps of the FIG. 2 process are illustratively performed at least in part by or under the control of an MPIO driver of a given host device. For example, portions of the process may be carried out under the control of software, firmware and/or hardware of an instance of naming logic deployed within the MPIO driver. Other arrangements of host device components and/or other system components can be configured to perform at least portions of one or more of the steps in other embodiments.

In step 200, an MPIO driver monitors creation of multi-path logical devices for logical volumes of a storage array.

In step 202, a determination is made as to whether or not a first multi-path logical device has been created for a logical volume of the storage array. If a first multi-path logical device has been created for the logical volume, the process moves to step 204, and otherwise returns to step 200 to continue to monitor for creation of multi-path logical devices for logical volumes of the storage array.

In step 204, the MPIO driver queries the storage array to determine any user-defined name of the logical volume.

In step 206, a determination is made as to whether or not the storage array returns a user-defined name for the logical volume. If a user-defined name is returned, the process moves to step 208, and otherwise moves to step 212 as indicated.

In step 208, the MPIO driver creates a second multi-path logical device having the user-defined name.

In step 210, the MPIO driver processes IO operations directed to the second multi-path logical device having the user-defined name as if such IO operations were directed to the first multi-path logical device for the logical volume. The process then returns to step 200 to continue to monitor for creation of multi-path logical devices for logical volumes of the storage array.

In step 212, the MPIO driver processes IO operations directed to the first multi-path logical device for the logical volume. The process then returns to step 200 to continue to monitor for creation of multi-path logical devices for logical volumes of the storage array.

Additional or alternative steps can be used in other embodiments. For example, in some embodiments, the process can be modified to eliminate step 202 and other associated processing, possibly when the process is implemented using certain types of host device operating systems, such as non-Linux operating systems.

Accordingly, the querying of the storage array in step 204 in alternative embodiments need not be responsive to a determination that a first logical device has been created for a logical volume of the storage array, and can instead be initiated responsive to one or more other specified conditions. In arrangements of this type, the multi-path logical device created in step 208 may comprise a first multi-path logical device created for the logical volume. Numerous other alternative embodiments are possible.

The particular processing operations and other system functionality described in conjunction with the flow diagram of FIG. 2 are therefore presented by way of illustrative example only, and should not be construed as limiting the scope of the disclosure in any way. Alternative embodiments can use other types of processing operations involving host devices, storage systems and functionality for automatic creation of multi-path logical devices with user-defined names. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different arrangements for automated creation of multi-path logical devices within a given information processing system. As a more particular example of an arrangement of the latter type, multiple additional instances of the FIG. 2 process may be performed in respective additional host devices that share the storage array.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Referring now to FIG. 3, another illustrative embodiment is shown. In this embodiment, software code is shown for a rule ("udev rule") and a corresponding script utilized in one possible implementation of the FIG. 2 process for automatic creation of multi-path logical devices with user-defined names. It is assumed for this embodiment that the host device comprises a device manager which includes management functionality relating to creation of logical devices on the host device. Such a device manager is an example of what is more generally referred to elsewhere herein as a component of the host device. It is possible that the device manager in some embodiments can be implemented at least in part within an MPIO driver as that latter term is broadly used herein.

If a multi-path logical device is created, the rule of FIG. 3 is triggered that in turn runs the script shown in FIG. 3. The script uses the MPIO driver to query the storage system to determine if a user-defined name exists for the logical volume. If a user-defined name is returned, then the script will create a second multi-path logical device having the user-defined name, denoted nice_name in the figure, and having the same major and minor number as the multi-path logical device that triggered the rule.

An additional example of an illustrative embodiment implemented using the FIG. 2 process for automatic creation of multi-path logical devices with user-defined names in a multi-path layer will now be described.

It is assumed in this embodiment that the MPIO driver of a given host device provides automatic creation functionality, under the control of a corresponding instance of naming logic implemented in the MPIO driver, possibly with involvement of other host device components, such as the above-noted device manager.

It is further assumed that when new LUNs are provisioned, they are automatically given corresponding identifiers such as a world-wide name (WWN) and a Logical Device ID. The storage array in this embodiment is assumed to provide an ability to assign a nice name or other type of user-defined name, such as OracleDB or OracleLog, to a given LUN. When LUNs are configured on the host device, standard query commands will typically give only the WWN and the Logical Device ID details. In order to get the nice name, an array-specific proprietary command may need to be sent.

An MPIO driver in this embodiment is illustratively configured to group multiple paths from a host device to a storage array LUN into a multi-path logical device and to assign a name, such as emcpowerX in PowerPath® or mpathX in native multi-pathing, to that multi-path logical device. Applications use a multi-path logical device for their IO operations so that the IO operations can be distributed across all available paths by the MPIO driver using its path selection functionality described elsewhere herein.

Multi-path drivers such as PowerPath® are illustratively configured to display the nice names of respective LUNs in a command line interface (CLI) utility output, referred to below as a "powermt display." Absent use of the automatic creation techniques disclosed herein, the user typically has to utilize this utility to determine the multi-path logical device that was created for a particular LUN. It can be quite tedious to figure out the LUN to multi-path logical device mapping especially if there are a large number of LUNs.

An example "powermt display" output is as follows:
Pseudo name=emcpowerf
VNX ID=APM00000000001 [SG_lnd123456]
Logical device ID=00000000000000000000000000000001 [OracleDB]

In the above "powermt display" output, "OracleDB" is the nice name given to this LUN on the storage array. For this LUN, PowerPath® creates a multi-path logical device, denoted /dev/emcpowerf. Absent use of the automatic creation techniques disclosed herein, the user in this example has to run the "powermt display" command to determine that that the "OracleDB" LUN is actually the/dev/emcpowerf multi-path logical device and then has to configure/dev/emcpowerf for his or her applications.

The present embodiment addresses this issue by configuring the multi-pathing software to automatically create a multi-path logical device with the same name as the nice name specified for a LUN on the storage array. This can be accomplished using a udev rule in Linux and an associated script, as illustrated in FIG. 3. Udev is a device manager for the Linux kernel and manages devices in the/dev folder. It handles all user-space events that are raised when hardware devices are added or removed from the system. The udev package comes with an extensive set of rules that match against exported values of the event and properties of the discovered device. A matching rule will possibly name and create a multi-path logical device and run configured programs to set up and configure the device.

The following steps illustrate how a multi-path logical device is created for a LUN. Assume that the LUN is provisioned with logical device ID, 1234, and a nice name of "TestLun" on the storage array and is already connected to a host.

1. On the host, a bus scan is performed to add the native devices of the LUN. If PowerPath® for Linux version 6.4 or newer is installed on the host, the bus scan is automatically done by PowerPath® and no manual operation is necessary.

2. PowerPath® will auto-configure the native devices and will also create a new multi-path logical device, say /dev/emcpowera, for it.

A "powermt display dev=all" command will show the details of LUN 1234. It will indicate that the logical device ID is 1234, the nice name is "TestLun" and the logical device created for it is /dev/emcpowera.

In the present embodiment, a new udev rule is inserted in the host. This rule will be automatically triggered on the addition of logical devices with the pattern "emcpower." In addition, the rule will internally run "powermt display dev=<emcpower name>," to determine the nice name for the LUN. It will also determine the major/minor number of the emcpowerX device. It will then create a new logical device having as its name the nice name of the LUN and having the same major/minor number as the emcpowerX device.

Accordingly, with the new udev rule in place, the following steps will be automatically performed after the first two steps mentioned above that illustrate how a new LUN is configured in PowerPath®.

3. The udev rule is triggered as a new emcpowerX device is created.

4. The rule will run "powermt display dev=all" and determine that the nice name of the LUN is "TestLun."

5. The rule will then find that the major/minor number of/dev/emcpowera device is 120/0.

6. The rule will now create a new logical device with the following command:
mknod/dev/TestLun b 120 0

Steps 1-6 above are performed automatically without any manual intervention. And two new multi-path logical devices will be created, one with the standard name of the multi-path logical device, /dev/emcpowera, and the other with the nice_name, /dev/TestLun. This example may be viewed as a more particular illustration of the functionality provided by the software code shown in the embodiment of FIG. 3.

Operations that were previously performed on the first multi-path logical device /dev/emcpowera can now be done on the second multi-path logical device, /dev/TestLun. Examples of such operations include create filesystem, mount filesystem, perform IOs on mounted filesystem, perform raw IOs directly to the device, etc.

Accordingly, IO operations directed to the second multi-path logical device having the user-defined name are processed as if those IO operations were actually directed to the first multi-path logical device.

In the present embodiment, as logical devices with nice names will be automatically created, users can utilize them directly. A user does not have to perform manual operations to determine the multi-path logical device corresponding to a particular nice name.

In addition, it is easier for users to determine which multi-path logical devices need to be used for each application. For example, /dev/OracleDB for an Oracle DB application and /dev/OracleLog for an Oracle Log application.

As indicated previously, different instances of the above-described process and other processes for automatic creation of multi-path logical devices with user-defined names as disclosed herein can be performed by different MPIO drivers in different host devices.

The particular automatic creation arrangements described above are presented by way of illustrative example only. Numerous alternative arrangements of these and other features can be used in implementing the FIG. 2 process and other illustrative embodiments.

The illustrative embodiments disclosed herein can provide a number of significant advantages relative to conventional arrangements.

For example, some embodiments configure a multi-path layer of one or more host devices to include functionality for automatic creation of multi-path logical devices with user-defined names.

Such embodiments can advantageously allow one or more user applications running on a given host device to automatically obtain the benefit of the user-defined name of a particular logical volume, while completely avoiding the need for any manual operations for discovery and mapping of the user-defined name.

For example, in scenarios where numerous host devices need to be installed and configured from a template, no manual steps need to be performed on each host device to obtain and utilize the desired user-defined names for the attached LUNs.

These and other arrangements are advantageously configured to provide efficient automatic creation of multi-path logical devices with user-defined names even in the presence of substantial path changes such as those that may result when paths are added or deleted as a result of zoning and masking changes or other types of storage system reconfigurations performed by a storage administrator or other user.

Such embodiments make the application workflow considerably easier for system users by facilitating utilization of user-defined names for logical volumes. For example, illustrative embodiments can eliminate multiple manual steps that a user would otherwise have to perform on a host device in order to start using a newly-provisioned LUN with a user-defined name. Additional advantages in terms of added clarity are provided for users well after the initial provisioning of a LUN.

Moreover, illustrative embodiments can be adapted for use with any of a wide variety of different types of multi-pathing software from different vendors.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™, or Vblock® converged infrastructure from Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the instances of naming logic 114 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, naming logic and additional or alternative components. Also, the particular configurations of system and device elements and associated processing operations illustratively shown in the drawings can be varied in other embodiments. For example, a wide variety of different MPIO driver configurations and associated arrangements for automatic creation of multi-path logical devices can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
a host device comprising a processor coupled to a memory;
the host device being configured to communicate over a network with a storage system;
the host device further comprising:
a multi-path input-output driver configured to control delivery of input-output operations from the host device to the storage system over the network;
wherein the multi-path input-output driver is further configured:
responsive to creation of a first multi-path logical device for a logical volume of the storage system, to query the storage system to determine a user-defined name for the logical volume;
responsive to receipt of the user-defined name for the logical volume from the storage system, to create a second multi-path logical device having the user-defined name; and
to process input-output operations directed to the second multi-path logical device having the user-defined name as if those input-output operations were actually directed to the first multi-path logical device.

2. The apparatus of claim 1 further comprising one or more additional host devices each configured to communicate over the network with the storage system and wherein each additional host device comprises a multi-path input-output driver configured to control delivery of input-output operations from the host device to the storage system over the network.

3. The apparatus of claim 1 wherein the multi-path input-output driver in controlling delivery of input-output operations from the host device to the storage system over the network is further configured to select particular ones of the input-output operations for delivery over particular ones of a plurality of paths from the host device to the storage system.

4. The apparatus of claim 3 wherein the plurality of paths comprise paths associated with respective initiator-target pairs wherein each of the initiators comprises a corresponding host bus adaptor of the host device and each of the targets comprises a corresponding port of at least one storage array of the storage system.

5. The apparatus of claim 1 wherein the logical volume comprises at least one logical unit of the storage system.

6. The apparatus of claim 1 wherein the multi-path input-output driver is further configured:
to interact with a device manager that operates in accordance with a plurality of specified rules;
a given one of the rules comprising a rule that triggers execution of a script responsive to creation of the first multi-path logical device for the logical volume of the storage system;
the script being configured to query the storage system to determine the user-defined name for the logical volume, and responsive to receipt of the user-defined name for the logical volume from the storage system, to create the second multi-path logical device having the user-defined name.

7. The apparatus of claim 1 wherein querying the storage system to determine a user-defined name for the logical volume comprises sending a predetermined command to the storage system.

8. The apparatus of claim 7 wherein the predetermined command comprises a vendor unique command in an otherwise standardized command format.

9. The apparatus of claim 1 wherein querying the storage system to determine a user-defined name for the logical volume comprises executing a display utility command that obtains the user-defined name from the storage system.

10. The apparatus of claim 9 wherein execution of the display utility command returns an identifier of the first multi-path logical device, an identifier of the logical volume, and the user-defined name for the logical volume.

11. The apparatus of claim 9 wherein the display utility command is triggered by a rule configured to detect a specified naming pattern for multi-path logical device names that encompasses an automatically-assigned name of the first multi-path logical device.

12. The apparatus of claim 1 wherein creating a second multi-path logical device having the user-defined name further comprises:
determining a major number and a minor number for the first multi-path logical device; and configuring the second multi-path logical device to have the same major number and the same minor number as the first multi-path logical device.

13. The apparatus of claim 1 wherein one or more applications direct the input-output operations to the second multi-path logical device having the user-defined name.

14. The apparatus of claim 1 wherein the multi-path input-output driver is further configured:
responsive to removal of the first multi-path logical device, to remove the second multi-path logical device having the user-defined name.

15. A method comprising:
configuring a multi-path input-output driver of a host device to communicate with a storage system over a network;
creating a first multi-path logical device for a logical volume of the storage system;
the multi-path input-output driver:
responsive to the creation of the first multi-path logical device for the logical volume of the storage system, querying the storage system to determine a user-defined name for the logical volume;
receiving the user-defined name for the logical volume from the storage system;
responsive to receipt of the user-defined name for the logical volume from the storage system, creating a second multi-path logical device having the user-defined name; and
processing input-output operations directed to the second multi-path logical device having the user-defined name as if those input-output operations were actually directed to the first multi-path logical device.

16. The method of claim 15 wherein querying the storage system to determine a user-defined name for the logical volume comprises executing a display utility command that obtains the user-defined name from the storage system.

17. The method of claim 15 wherein creating a second multi-path logical device having the user-defined name further comprises:

determining a major number and a minor number for the first multi-path logical device; and
configuring the second multi-path logical device to have the same major number and the same minor number as the first multi-path logical device.

18. A computer program product comprising a non-transitory processor-readable storage medium having stored therein program code of one or more software programs, wherein the program code, when executed by a host device comprising a multi-path input-output driver, the host device being configured to communicate over a network with a storage system, causes the multi-path input-output driver:
responsive to creation of a first multi-path logical device for a logical volume of the storage system, to query the storage system to determine a user-defined name for the logical volume;
responsive to receipt of the user-defined name for the logical volume from the storage system, to create a second multi-path logical device having the user-defined name; and
to process input-output operations directed to the second multi-path logical device having the user-defined name as if those input-output operations were actually directed to the first multi-path logical device.

19. The computer program product of claim 18 wherein querying the storage system to determine a user-defined name for the logical volume comprises executing a display utility command that obtains the user-defined name from the storage system.

20. The computer program product of claim 18 wherein creating a second multi-path logical device having the user-defined name further comprises:
determining a major number and a minor number for the first multi-path logical device; and
configuring the second multi-path logical device to have the same major number and the same minor number as the first multi-path logical device.

\* \* \* \* \*